(12) United States Patent
Woo

(10) Patent No.: US 6,273,493 B1
(45) Date of Patent: Aug. 14, 2001

(54) VEHICLE COVER

(76) Inventor: Joo Chul Woo, 880 Bono-dong, Ansan-shi, Kyonggi-do 425-180 (KR)

( * ) Notice: Subject to any disclaimer, the term of this patent is extended or adjusted under 35 U.S.C. 154(b) by 0 days.

(21) Appl. No.: 09/596,147

(22) Filed: Jun. 16, 2000

(30) Foreign Application Priority Data

Dec. 17, 1999 (KR) .................................................. 99-28610

(51) Int. Cl.⁷ .................................................. B60R 27/00
(52) U.S. Cl. .......................................... 296/136; 150/166
(58) Field of Search ........................ 296/136; 150/166; 280/770

(56) References Cited

U.S. PATENT DOCUMENTS 4,997,229 * 3/1991 Swanson ............................. 296/136
5,042,836 * 8/1991 Swanson .......................... 296/136 X
5,328,230 * 7/1994 Curchod ................................. 296/136
5,820,196 10/1998 Rudys et al. .
5,845,958 12/1998 Rudys et al. .

OTHER PUBLICATIONS

Document 149092 with English translation of abstract (2 pages) date Mar. 23, 1999 country Korea.

* cited by examiner

Primary Examiner—Joseph D. Pape
(74) Attorney, Agent, or Firm—Ladad & Parry

(57) ABSTRACT

A vehicle cover system comprises a hood cover segment for covering the hood of a vehicle; a roof cover segment for covering the roof of the vehicle; and a trunk cover segment for covering the trunk door of the vehicle. By deploying and installing the cover segments on the hood, roof, and trunk door of the vehicle respectively, the mounting operation of the vehicle cover system as a whole is completed and it is possible to protect the vehicle body and paint finish thereon.

7 Claims, 4 Drawing Sheets

VEHICLE COVER

BACKGROUND OF THE INVENTION

1. Field of the Invention

The present invention relates to a vehicle cover system for protecting the exterior finish and maintaining aesthetic appeal of a vehicle, and more particularly, the present invention relates to a vehicle cover which is installed on the body of a vehicle for protecting paint finish exposed to natural conditions such as foreign materials, sunlight, and the like.

2. Description of the Related Art

Generally, as a painted surface of a vehicle is exposed to foreign materials including small pebbles, debris, dust, smog, and so forth and weather elements such as sunlight comprising of strong ultraviolet rays, rainwater, etc., there is a possibility for the painted surface to undergo quality degradation such as discoloring and scratching.

In the case of a vehicle discharged from a factory, before it is delivered to a dealer or purchaser, the exterior finish of the vehicle must be protected to the maximum. In particular, this has critical importance when the vehicle is stored for a lengthy period of time at a wharf or ship for export.

In order to export a vehicle, about 3 or more months are required for conducting customs formalities and transportation. In this regard, a method for attaching an opaque vinyl wrapper to the vehicle using adhesive, and a method of applying a rust resistor to the vehicle are disclosed in the art as a technique for protecting a painted surface of a vehicle.

However, in the former case, problems are induced in that adhesive remains on the surface of a vehicle, and due to difficulties in mounting and removing the opaque vinyl wrapper, a number of workers and a long period of time are required. Therefore, loss is caused in terms of both time and cost.

Moreover, in the latter case, drawbacks are provoked in that the paint finish is likely to be discolored when bird droppings adhere thereto. Further, since wastewater is produced upon washing a vehicle to remove the rust resistor, environmental pollution is incurred. Consequently, the use of the rust resistor is not allowed in a diversity of countries.

SUMMARY OF THE INVENTION

Accordingly, the present invention has been made in an effort to solve the problems occurring in the related art, and the object of the present invention is to provide a vehicle cover which is easily mounted and removed from a vehicle and does not cause any environmental pollution.

In order to achieve the above object, according to the present invention, there is provided a vehicle cover system comprising: a hood cover segment to cover the hood of the vehicle; a roof cover segment for covering a roof of the vehicle; and a trunk cover segment for covering a trunk door of the vehicle.

Due to the features of the present invention, by deploying and installing the cover segments on the hood, roof, and trunk door of the vehicle respectively, the mounting operation of the vehicle cover system as a whole is completed and it is possible to protect the vehicle body and paint finish thereon.

BRIEF DESCRIPTION OF THE DRAWINGS

The above objects, and other features and advantages of the present invention will become more apparent after reading the following detailed descriptions when read in conjunction with the drawings.

DETAILED DESCRIPTION OF PREFERRED EMBODIMENTS

Figure 1:
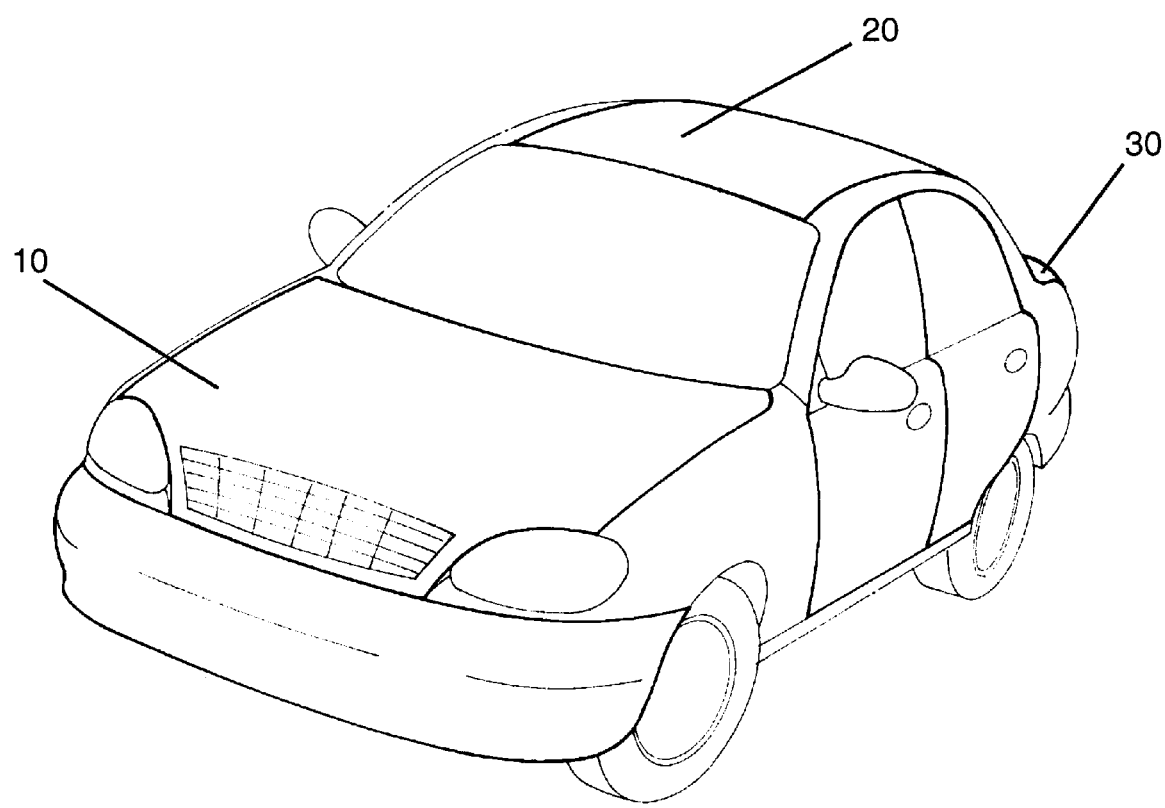
FIG. 1 is a perspective view illustrating the state wherein a vehicle cover, in accordance with an embodiment of the present invention, is installed on a vehicle.

Reference will now be made in greater detail to a preferred embodiment of the invention, an example of which is illustrated in the accompanying drawings. Wherever possible, the same reference numerals will be used throughout the drawings and the descriptions to refer to the same or like parts.

A vehicle cover system according to the present invention is formed by super-fine, high-density, non-directional polyethylene fiber. Each strand of which has a diameter of 0.05–10 $\mu$m. Due to the fact that the vehicle cover is formed by heat and pressure without addition of any binder or filler, the vehicle cover is lightweight and durable and has excellent elasticity and flexibility. Furthermore, since the vehicle cover does not produce dust, it does not induce any flaws on a painted surface of a vehicle.

Also, the vehicle cover system in accordance with the present invention does not react with acid, alkali, saline matter, and so on. It has chemical resistance which enable the vehicle cover not to be susceptible to chemical substance. The vehicle cover system is not torn while conducting folding and unfolding operations in excess of 20,000 times and has conformability by which it smoothly fits about an undulating surface contour of a vehicle body.

In addition, even in the case that the surface of the vehicle body holds moisture, it is dried in a short period of time, because the vehicle cover system has air permeability and waterproofness. Thus, the painted surface of the vehicle body can always be maintained in a dried state. The vehicle cover system does not absorb moisture even in high humidity climatic conditions, and thus moisture proof of the vehicle cover is ensured so that mold does not gather thereon.

Furthermore, the vehicle cover system has heat and ultraviolet ray insulating characteristics, and is made from anti-static material such that it can exhibit optimum performance for protecting the painted surface of the vehicle body.

FIG. 1 is a perspective view illustrating a state wherein a vehicle cover in accordance with an embodiment of the present invention is installed on a vehicle.

FIG. 1, the vehicle cover system according to the present invention includes a hood cover segment 10, a roof cover segment 20 and a trunk cover segment 30 which are separately formed from another to cover a body of a vehicle which is divided, for example, into three parts.

Figure 2:
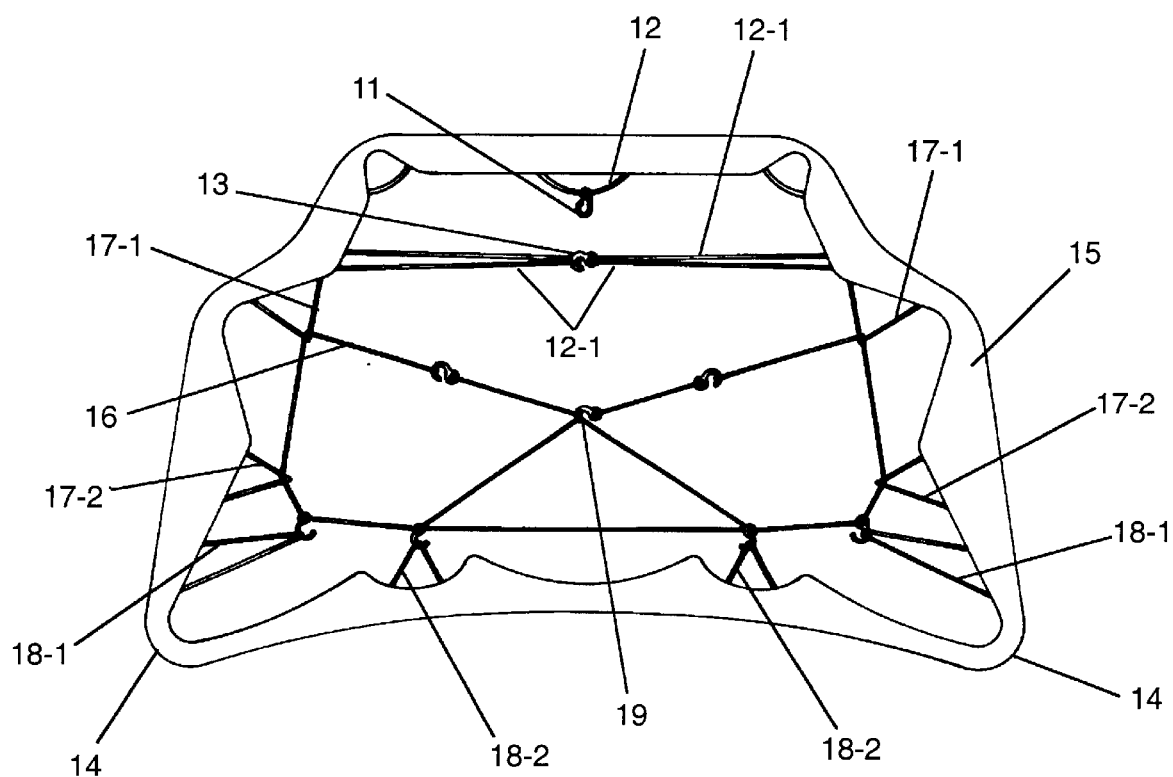
FIG. 2 is a bottom view illustrating a hood cover segment.

FIG. 2 is a bottom view illustrating a hood cover segment. The hood cover segment 10 includes a first hook member 11 and a second hook member 13. The first hook member 11 which is connected to a first elastic band 12, is engaged with a flange portion which defines an opening inward of a hood grille, and functions to secure the hood cover segment 10 to the hood of the vehicle. The first elastic band 12 is fastened to the front end of the hood cover segment 10. The second hook member 13 hooks a second elastic band 12-1 thereby increasing closeness of the hood cover segment 10, especially, a portion of the hood cover segment 10, to a front grille portion of the hood. The second hook member 13 and the second elastic band are fastened to both side ends of the hood cover segment 10, respectively.

A pair of first pocket portions 14 are defined at both coner portions, respectively, at the rear end of the hood cover segment 10. The pair of first pocket portions 14 are inserted in an opening inward of both corresponding coner portions, respectively, of the rear end of the hood, and function to secure the hood cover segment 10 to the hood of the vehicle.

A first inner portion 15 which is stitched to the hood cover segment 10, is pulled inward toward the center of the hood when the hood cover segment 10 is installed on the hood, to be positioned below the hood, and functions to secure the hood cover segment 10 to the hood of the vehicle.

A plurality of first webbing bands 17-1, 17-2, 18-1 and 18-2 are fastened to both side ends and the rear end of the hood cover segment 10. Each of a plurality of separate webbing bands 16 has at least one third hook member 19 for pulling inward and thereby tightening the plurality of first webbing bands 17-1, 17-2, 18-1 and 18-2. Therefore, the plurality of separate webbing bands 16 enable the hood cover segment 10 to adhere closely to the surface of the any vehicle hood.

Figure 3A:
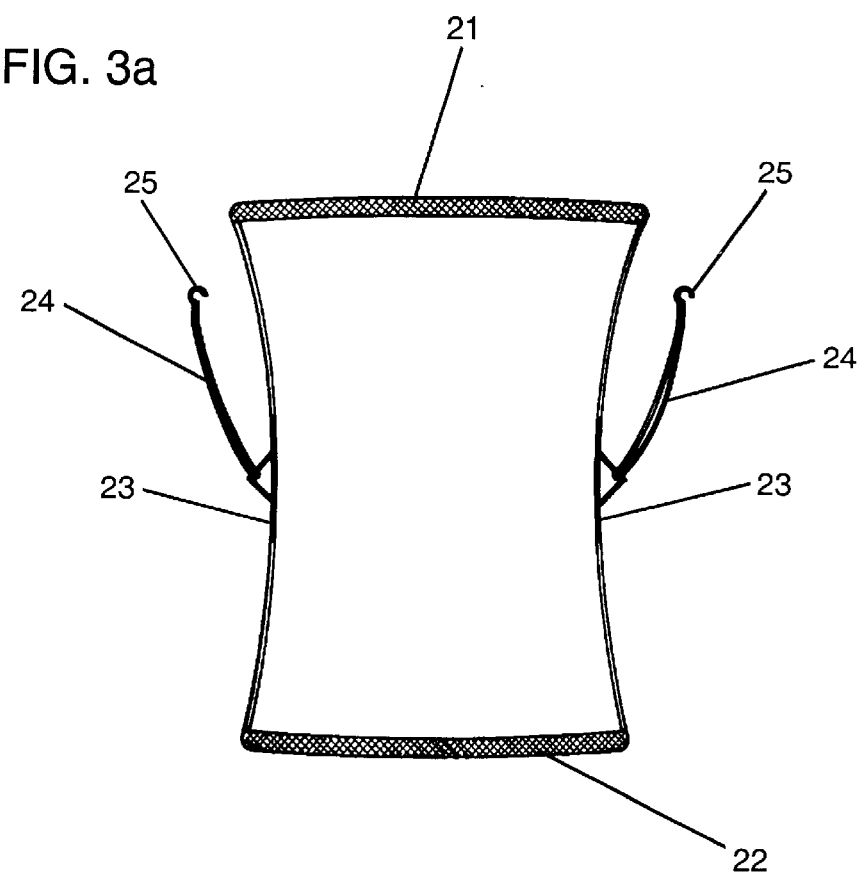
FIG. 3a is a plan view illustrating a roof cover segment.
Figure 3B:
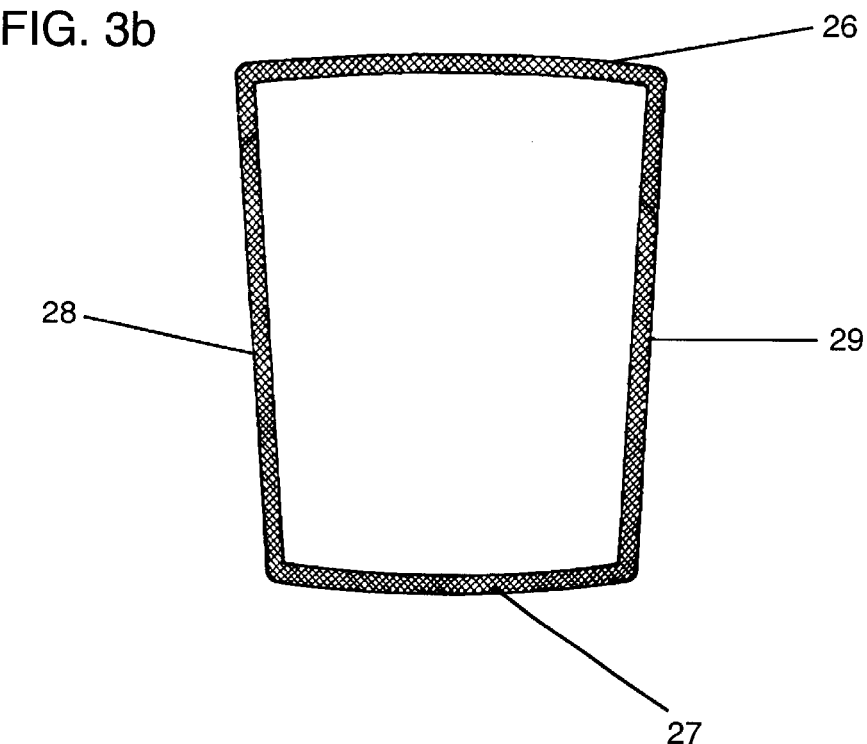
FIG. 3b is a plan view illustrating another roof cover segment.

FIGS. 3a and 3b are plan views illustrating roof cover segments.

The roof cover segment 20 is divided into two types. As can be readily seen from FIG. 3a, a first type roof cover segment 20 includes a pair of double-sided tape elements 21 and 22, which are attached along painted surfaces of the roof above rubber moldings of front and rear windshields for increasing closeness of the roof cover segment 20 to the roof of the vehicle. Due to the fact that the front windshields is not obscured by the roof cover segment 20, a forward field of view is maintained.

The first type roof cover segment 20 further includes a pair of webbing bands 24 and a pair of stitched pieces 23. The pair of webbing bands 24 extend from both side ends, respectively, of the roof cover segment 20. Each webbing band 24 is releasably joined by virtue of a pair of hook members 25 to a lower edge of the body of the vehicle between the front door and rear doors. The pair of stitched pieces 23 extend downward from both side ends, respectively, of the roof cover segment 20. Each stitched piece 23 is caught by at least one of the front and rear doors when the front and rear doors are closed, thereby preventing rainwater or foreign materials from entering underneath the roof cover segment 20.

As a person skilled in the art will readily recognize, the double-sided tape elements 22 which is attached along the painted surface of the roof above the rubber molding of the rear windshields, performs the same function as the double-sided tape element 21 which is attached along the painted surface of the roof above the rubber molding of the front windshield glass.

Next, as can be readily seen from FIG. 3b, in the case of a second type roof cover segment 20, all the components such as hook members and elastic bands are removed. Instead, the roof cover segment 20 is directly attached along all four ends to the roof of the vehicle by four double-sided tape 26, 27, 28 and 29. Therefore, inflow of rainwater and/or foreign materials is effectively prevented through perfect closeness of the roof cover segment 20 to the roof of the vehicle. Since the roof cover segment 20 does not obscure the front and rear windshields, a driver can maintain a 100% forward field of view. At this time, the double-sided tape elements 25, 26, 27 and 28 are processed by a lamination coating technique whereby the roof cover segment 20 can be attached and detached from the roof of the vehicle body over a multitude of times.

Figure 4A:
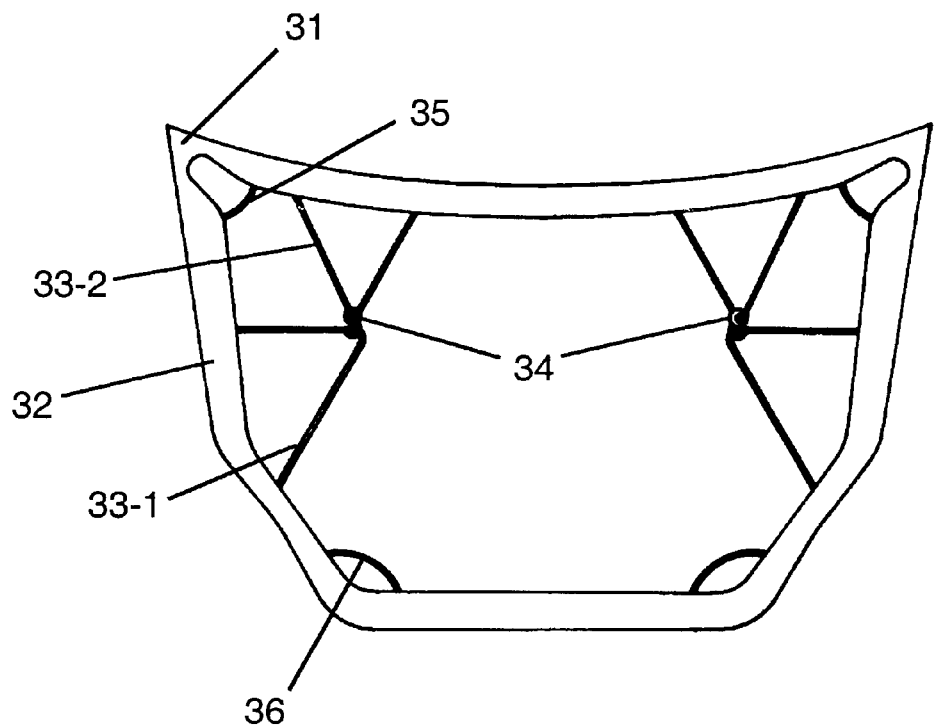
FIG. 4a is a bottom view illustrating a trunk cover segment.

FIG. 4a is a bottom view illustrating a trunk cover segment.

Similarly to the roof cover segment 20, the trunk cover segment 30 is also divided into two types. As shown in FIG. 4a, a first type trunk cover segment 30 includes a pair of pocket portions 31 which are defined at both coner portions at the front end of the trunk cover segment 30. The pair of pocket portions 31 are inserted in an opening inward of both corresponding corner portions of the front end of the trunk door and function to secure the trunk cover segment 30 to the trunk door of the vehicle.

The first type trunk cover segment 30 further includes an inner lining portion 32 which is stitched to the trunk cover segment 30. The inner lining portion 32 is pulled inward when the trunk cover segment 30 is installed on the trunk door, to be positioned below the trunk door, thereby securing the trunk cover segment 30 to the trunk door of the vehicle.

A pair of hook members 34 are connected to a pair of elastic bands 33-1 and 33-2 which are fastened to both side ends and the front end of the trunk cover segment 30, and function to increase closeness of the trunk cover segment 30 to the trunk door of the vehicle.

A pair of elastic bands 35 and 36 are arranged at corner portions of the trunk cover segment 30. Each elastic band 35 or 36 renders predetermined elasticity to each corner portion of the trunk cover segment 30 in a manner such that the corner portion is easily and elastically widened when the trunk cover segment 30 is installed on the trunk door of the vehicle. In addition, it is not susceptible to easy stretching after the trunk cover segment 30 is installed on the trunk door of the vehicle.

Figure 4B:
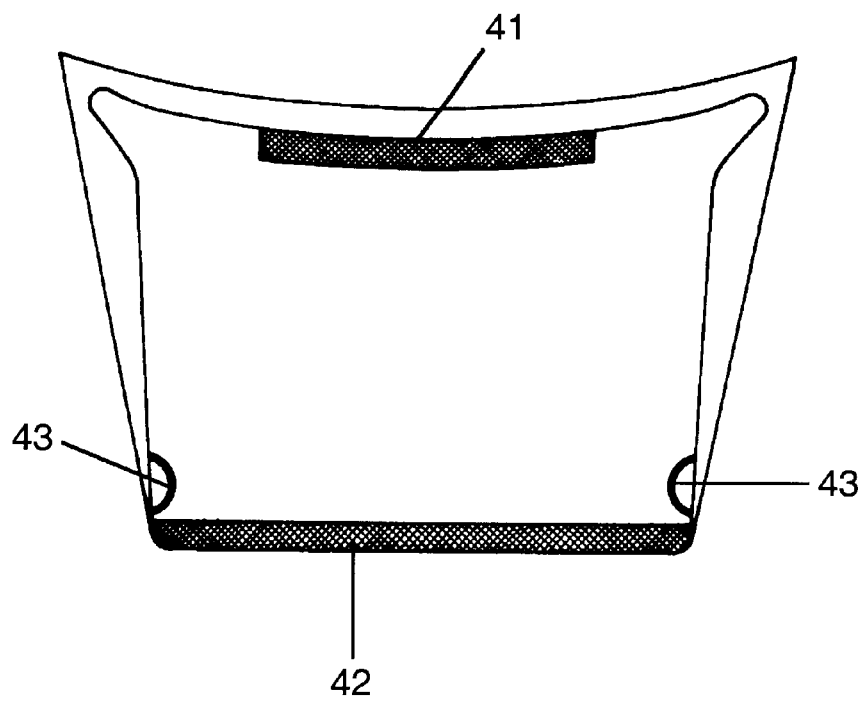
FIG. 4b is a bottom view illustrating another trunk cover segment.

FIG. 4b is a bottom view illustrating a second type trunk cover segment 30, wherein the second type trunk cover segment 30 is attached along front and rear ends thereof, by a pair of double-sided tape elements 41 and 42, and along side ends thereof, by a pair of elastic bands 43, to the trunk door of the vehicle. The pair of elastic bands 43 are hooked to rubber moldings provided to the trunk door of the vehicle.

As described above, by dividing the vehicle body into three parts and installing the corresponding cover segments on the three parts, mounting of the vehicle cover is fulfilled.

The vehicle cover system according to the present invention has characterizing features in that it comprises three separate cover segments in such a manner that it not only protects the painted finish of the vehicle, but also does not impose a limitation on the usual travel of the vehicle, such as transportation, inspection, shipping, etc.

Due to the fact that an edge portion of each cover segment is pulled inward toward the center of each part of the vehicle to be positioned below the corresponding part of the vehicle, each cover segment can fully cover an outer surface of the corresponding part of the vehicle to protect the corresponding part from wind, rain, etc.

A stitching line of each cover segment is located adjacent to the edge portions so that rainwater can easily flow down stitching line. Portions of the cover segment where two cover elements are overlapping while stitched to each other, is placed on a inner, lower surface of the corresponding part of the vehicle such as the hood or trunk door, to prevent rainwater from soaking therethrough.

Each of both side ends of the roof cover segment is arranged as a draining groove defined between the roof and the front and rear doors. The roof cover segment is constructed in a manner such that sealing is automatically accomplished when the front and rear doors are closed, thus preventing water leakage and inflow of wind between the roof cover segment and the roof.

In the case that the vinyl wrapper is used as in the conventional art, air bubbles flow into the space between each cover segment and the corresponding part of the vehicle. If moisture inflow occurs, since moisture cannot be easily vaporized and discharged to the outside, the painted surface of the vehicle body can be damaged.

In the present invention, two persons can complete a mounting operation. of the vehicle cover system as a whole in 2–3 minutes by simply installing the cover segments on the corresponding parts of the vehicle, and thus workability is improved. In the case that the vinyl wrapper is used as in the conventional art, 10 times the amount of the above-described time is needed.

By the fact that the variety of parts of the vehicle are separately covered or obscured by the cover segments, it is not necessary to remove the cover segments from the vehicle for the purpose of inspection or movement of the corresponding vehicle. An initial painted state is maintained, and mounting and removing operations of the cover segments are not needed to be repeatedly performed.

As a result, the vehicle cover system according to the present invention provides advantages in that front and rear windshields of a vehicle are not covered or obscured by the vehicle cover, thus allowing the advantage of securing a field of view to freely move it from place to place irrespective of daytime and nighttime driving.

Also, because cover segments are separately installed on a variety of parts of the vehicle, front and rear doors, a hood and trunk doors can be opened and closed in a free manner. Further, since the vehicle cover system is reliably brought into contact with a painted surface of a vehicle body without using any bonding agent, simply by removing the vehicle cover from the vehicle, an initially painted state of the vehicle body is maintained as it is, and therefore, it is not necessary to implement a separate post-treatment after storage.

Further, material of the vehicle cover system is not degradable in its quality and holds its initial characteristic nature. By simply removing foreign materials accumulated on the cover segments by washing with water, the cover segments can be reused. In this connection, it is to be noted that the vinyl wrapper which is employed in the conventional art, cannot be reused.

Moreover, because the vehicle cover system is made of polyethylene fiber, upon disposal of a wasted vehicle cover by burning under proper circumstances, precipitates and other environmental polluting substances are not created. Consequently, the vehicle cover according to the present invention is advantageous in view of the protection of the environment.

Additionally, when the vehicle cover system is installed on the vehicle, a fresh outer appearance is rendered to the finished vehicle. In the case that a logo, etc. are printed on the vehicle cover, advertising effectiveness and reliability of the finished vehicle to a customer can be accomplished. The cover segments according to the present invention are configured, that is, designed and cut in a manner such that they fit about undulating surfaces of the variety of vehicle parts. As a consequence, inflow of foreign materials between the cover segments and the variety of parts is prevented, and rattling of the cover segments while running is minimized. Hence, a design which remarkably reduces the likelihood of fine scratches to be formed on the painted surface of the vehicle body, is achieved. Due to the fact that the cover segments are separately installed on the variety of parts (for example, a hood, a door, a trunk door or the like), painted finish protection of the vehicle and mounting convenience of the vehicle cover are enhanced to the maximum.

In the drawings and specifications, there have been disclosed typical preferred embodiments of the invention and, although specific terms are employed, they are used in a generic and descriptive sense only and not for purposes of limitation, the scope of the invention being set forth in the following claims.

What is claimed:

1. A vehicle cover system comprising a hood cover segment for covering a hood of a vehicle; a roof cover segment for covering a roof of the vehicle; and a trunk cover segment for covering a trunk door of the vehicle, characterized in that the hood cover segment includes:

a first elastic band having a first hook member connected thereto for securing the hood cover segment to the hood of the vehicle, the first elastic band being fastened to a front end of the hood cover segment;

hooking a second elastic band having a second hook member connected thereto for hooking the second elastic band to increase closeness of the hood cover segment, especially, a portion of the hood cover segment, to a front grille portion of the hood while the second hook member and the second elastic band is fastened to both side ends of the hood cover segment;

a pair of first pocket portions defined at both coner portions of the rear end of the hood cover segment, and inserted in an aperture inward of both corresponding coner portions of the rear end of the hood to secure the hood cover segment to the hood of the vehicle;

a first inner portion attached to the hood cover segment and pulled inward when the hood cover segment is installed on the hood, to be positioned below the hood, thereby securing the hood cover segment to the hood of the vehicle;

a plurality of first webbing bands fastened to both side ends and the rear end of the hood cover segment; and a plurality of separate webbing bands each having at least one third hook member for pulling inward and thereby tightening the plurality of first webbing bands, and the plurality of separate webbing bands enables the hood cover segment to adhere closely to the surface of the hood.

2. The vehicle cover system of claim 1 wherein the first inner portion is stitched to the hood cover segment.

3. A vehicle cover system comprising a hood cover segment for covering a hood of a vehicle; a roof cover segment for covering a roof of the vehicle; and a trunk cover segment for covering a trunk door of the vehicle, characterized in that the roof cover segment includes:

a pair of double-sided tape elements attached along painted surfaces of the roof above rubber moldings of front and rear windshields for increasing closeness of the roof cover segment to the roof of the vehicle;

a pair of webbing bands extending from both side ends, respectively, of the roof cover segment, each webbing band being releasably joined by virtue of a pair of hook members to a lower edge of a body of the vehicle between a front door and a rear door; and a pair of stitched pieces extending downward from both side ends, respectively, of the roof cover segment, each stitched pieces being caught by at least one of the front and rear doors when the front and rear doors are closed, thereby preventing rainwater or foreign materials from entering underneath the roof cover segment.

4. The vehicle cover system as claimed in claim 3, wherein the roof cover segment is directly attached along all four ends of the roof of the vehicle by double-sided tape elements.

5. A vehicle cover system comprising a hood cover segment for covering a hood of a vehicle; a roof cover segment for covering a roof of the vehicle; and a trunk cover segment for covering a trunk door of the vehicle, characterized in that the trunk cover segment includes:

a pair of pocket portions defined at both coner portions of the front end of the trunk cover segment, and inserted in an aperture inward of both corresponding corner portions of the front end of the trunk to secure the trunk cover segment to the trunk door of the vehicle;

an inner lining portion attached to the trunk cover segment and pulled inward when the trunk cover segment is installed on the trunk door, to be positioned below the trunk door, thereby securing the trunk cover segment to the trunk door of the vehicle;

a pair of elastic bands each having a hook member connected thereto which are fastened to both ends and the front end of the trunk cover segment, for increasing closeness of the trunk cover segment to the trunk door of the vehicle; and a pair of elastic bands arranged at corner portions of the trunk cover segment, each elastic band arranged at said corner portions rendering predetermined elasticity to each coner portion of the trunk cover segment in a manner such that the coner portion is easily widened when the trunk cover segment is installed on the trunk door and is not allowed to be easily stretched after the trunk cover segment is installed on the trunk door of the vehicle.

6. The vehicle cover system of claim 5 wherein the inner lining portion is stitched to the hood cover segment.

7. The vehicle cover system as claimed in claim 4, wherein the trunk cover segment is attached along front and rear ends, by a pair of double-sided tape elements, and along side ends thereof, by a pair of elastic bands, to the trunk door of the vehicle, and the last-mentioned pair of elastic bands being hooked to rubber moldings provided to the trunk door of the vehicle.

* * * * *

UNITED STATES PATENT AND TRADEMARK OFFICE
CERTIFICATE OF CORRECTION

PATENT NO. : 6,273,493 B1
APPLICATION NO. : 09/596147
DATED : August 14, 2001
INVENTOR(S) : Chul Woo Joo It is certified that error appears in the above-identified patent and that said Letters Patent is hereby corrected as shown below:

Title page, Item 76 (Inventor)

"Joo Chul WOO" should be "Chul Woo JOO"

Signed and Sealed this

Eighteenth Day of November, 2008

JON W. DUDAS
*Director of the United States Patent and Trademark Office*